(12) United States Patent
Rostaing et al.

(10) Patent No.: US 9,024,243 B2
(45) Date of Patent: May 5, 2015

(54) IMAGE SENSOR

(75) Inventors: Jean-Pierre Rostaing, La Cote Saint Andre (FR); Michael Tchagaspanian, Saint Ismier (FR); Arnaud Verdant, La Tour du Pin (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 55 days.

(21) Appl. No.: 14/005,698

(22) PCT Filed: Mar. 16, 2012

(86) PCT No.: PCT/EP2012/054684
§ 371 (c)(1),
(2), (4) Date: Sep. 17, 2013

(87) PCT Pub. No.: WO2012/126838
PCT Pub. Date: Sep. 27, 2012

(65) Prior Publication Data
US 2014/0008521 A1    Jan. 9, 2014

(30) Foreign Application Priority Data
Mar. 18, 2011    (FR) .................................... 11 52265

(51) Int. Cl.
*H04N 5/378* (2011.01)
*H04N 5/355* (2011.01)
(Continued)

(52) U.S. Cl.
CPC ........... *H04N 5/378* (2013.01); *H04N 5/35536* (2013.01); *H04N 5/3653* (2013.01); *H04N 5/37455* (2013.01)

(58) Field of Classification Search
CPC . H04N 5/378; H04N 5/35536; H04N 5/3653; H04N 5/37455
USPC ................................ 250/208.1; 348/294, 308
See application file for complete search history.

(56) References Cited

U.S. PATENT DOCUMENTS

| 7,221,397 B1 | 5/2007 | Kochi |
| 2005/0057389 A1* | 3/2005 | Krymski ........................ 341/169 |

(Continued)

FOREIGN PATENT DOCUMENTS

EP    0 905 971 A2    3/1999

OTHER PUBLICATIONS

International Search Report and Written Opinion issued Sep. 7, 2012 in PCT/EP2012/054684.

(Continued)

*Primary Examiner* — Seung C Sohn
(74) *Attorney, Agent, or Firm* — Oblon, McClelland, Maier & Neustadt, L.L.P.

(57) ABSTRACT

An image sensor includes a plurality of self-resetting pixels including: a mechanism converting detected electromagnetic energy into a proportional electric current; an integrating capacitor including a mechanism for fast charging to a first electric level and for controlled discharging to a second electric level; a mechanism for comparing the controlled discharge; a loopback mechanism, allowing automatic repetition of fast charging and controlled discharging cycles and counting of number of cycles occurring during a determined integration time; a mechanism measuring a residual electric charge present in the integrating capacitor on completion of the integration period; and a calibration mechanism using the measurement mechanism to measure and compensate for operating and production dispersions specific to each pixel.

13 Claims, 4 Drawing Sheets

(51) Int. Cl.
*H04N 5/365* (2011.01)
*H04N 5/3745* (2011.01)

(56) References Cited

U.S. PATENT DOCUMENTS

| | | |
|---|---|---|
| 2007/0165125 A1 | 7/2007 | Kochi |
| 2009/0121139 A1 | 5/2009 | Chammings |
| 2010/0194956 A1 | 8/2010 | Yuan et al. |
| 2011/0170657 A1 | 7/2011 | Mandier et al. |
| 2012/0039548 A1* | 2/2012 | Wang et al. ............... 382/312 |
| 2012/0138775 A1* | 6/2012 | Cheon et al. ............... 250/208.1 |
| 2012/0153130 A1* | 6/2012 | Nakamura et al. ......... 250/208.1 |

OTHER PUBLICATIONS

Y. Degerli, et al. "Column readout circuit with global charge amplifier for CMOS APS imagers" Electronics Letters, vol. 36, No. 17, Aug. 17, 2000, pp. 1457-1459.

J. Yuan, "Digital calibration technique for highly linear wide dynamic range CMOS imaging sensor" Electronics Letters, vol. 45, No. 9, Apr. 23, 2009, 2 Pages.

* cited by examiner

PRIOR ART

IMAGE SENSOR

TECHNICAL FIELD OF THE INVENTION

The present invention generally relates to optoelectronic image sensors organized in matrices of pixels, and more particularly the electronic means for measuring the radiation energy captured by each one of the pixels of the matrix.

STATE OF THE ART

An optoelectronic image sensor is a light-sensitive component intended for converting electromagnetic radiation into an electric signal. The electromagnetic radiation considered generally covers the entire spectrum of visible wavelengths. However, many sensors are also designed to detect other ranges of wavelengths, eg shorter ones in the ultraviolet or longer one, in the infrared. Whatever the range of wavelengths for which a sensor is designed, the ultimate goal is to faithfully restore, over its entire surface, a digital image in the widest possible operating range ranging from the lowest to the highest intensities that it must be able to measure, i.e. by making it possible to convert and measure the electromagnetic radiation detected with the highest possible resolution. The restored image can then be used directly by any computer system. For example, the basic component of digital still cameras produced since the nineties is an image sensor in the range of visible wavelengths.

First produced as so-called CCD ("charge coupled device") sensors, they are increasingly being replaced by so-called CMOS ("complementary metal oxide semiconductor") sensors which refer to the most widely used technology for many years, in the production of integrated circuits. Such technology simultaneously provides complementary (C) metal oxide semiconductor field effect transistors (MOS), with the main advantage being that the sensor, if not completely integrated, can at least be closely nested, at each pixel, on the same chip, with measuring circuits and other electronic conversion, storage and interfacing circuits required to obtain a complete electronic function.

Resolution is a crucial parameter in optoelectronic image sensors. Many research and development studies have focused on the improvement thereof, which should be achieved despite an ever greater integration is also desired. For example sensors including pixels of the self-resetting type, that reconcile to some extent such two imperatives, are known. Such type of sensor includes for each pixel:
means for converting the detected electromagnetic energy into an electric current proportional to said energy;
an integrating capacitor including means for charging to a first electric level and discharging controlled by the proportional electric current to a second predetermined electric level;
loopback and counting means allowing, on the one hand, the automatic repetition of charging and discharging cycles, and on the other hand, the counting of the number of cycles occurring during a given integration time.

Such sensor further comprises means for measuring a residual electric charge present in the integrating capacitor after said time of integration. As the number of cycles and the measure of the residual electric charge highly depend on the energy detected by the conversion means, they make it possible to estimate such energy for each pixel.

Such type of sensor thus enabled a substantial improvement of the resolution in the image obtained. Such a circuit is disclosed in a patent application published on Aug. 5, 2010 referenced as U.S. 2010/0194956 A1. Such a circuit nevertheless has the disadvantage of being relatively complex.

It would nevertheless be particularly advantageous to further improve the quality provided by the sensors without substantially increasing the size or complexity thereof.

The present invention proposes a solution to reach such goal.

SUMMARY

One aspect of the invention relates to an image sensor comprising a plurality of pixels, each pixel comprising:
means for converting the electromagnetic energy (E) detected by the pixel into an electric current (Id) proportional to said energy;
a first Cpix integrating capacitor and means so arranged as to cause a charge of such first Cpix capacitor to a first electric level (Vdd) and a discharge of such first Cpix capacitor to a second electric level (Vref), one of said discharge and said charge being controlled by the proportional electric current (Id), the other one of said charge or said discharge being controlled by an electric current flowing through a reset switch;
loopback means allowing the automatic repetition of charging and discharging of the first Cpix capacitor during charging and discharging cycles, the loopback means including a comparator having an input connected to the Cpix integrating capacitor, with the comparator output being connected to said reset switch;
counting means so configured as to count the number of cycles occurring during a given integration time (Tint) in the first Cpix capacitor, the sensor further comprising means for measuring a residual electric charge present in the first Cpix integrating capacitor after said time of integration and processing means so configured as to provide a digital value representative of the electromagnetic energy (E) detected as a function of said number of cycles and said residual electric charge.

The sensor further comprises calibration means so configured as to, in a calibration phase:
control the loopback means in order to successively establish the charge of the first pixel capacitor at the first, and then, at the second electric levels (Vdd, Vref), using said proportional electric current (Id) flowing through said conversion means to discharge or charge said first Cpix integrating capacitor and using said reset switch and/or an additional switch (reset) to charge or discharge said first Cpix integrating capacitor; and
measure, using said measuring means, the first and second electric levels established.

In addition, the sensor comprises storage means so configured as to store, during the calibration phase, values specific to each pixel corresponding to said first (Vdd) and second (Vref) electric levels and/or correction values calculated from said specific values. It is further so configured as to use, during a functional phase, said stored values specific to each pixel to correct said digital value representative of the detected electromagnetic energy (E).

Thus, the invention has the advantage of using, for the calibration, components that are used in the operational phase. In particular, the calibration phase uses the measuring means used for measuring the residual charge and uses the proportional electric current (Id) generated by the conversion means.

It should also be noted that the unavoidable process and implementation dispersions between pixels, which lead to the formation of a fixed background noise which is compensated upon completion of the calibration phase, are measured in situ in each pixel, using only components that are also all used functionally and by directly measuring the functional electric parameters, which avoids introducing the compensation of external factors that would otherwise affect the accuracy of the calibration. This is not the case in the prior art and more particularly in the document cited in the chapter on the state of the art, i.e. in the patent application U.S. 2010/0194956 A1 in which use is especially made of current sources and a reference analog-digital converter which are dedicated to the calibration and are not functionally reused.

Optionally and advantageously, the sensor comprises, in each pixel, a monostable circuit positioned between the comparator output and said reset switch. It also comprises switches positioned between the reset switch and respectively the monostable circuit or the comparator output for, on the one hand, directly connecting the comparator output to the reset transistor during a calibration phase and on the other hand, connecting the comparator output to the reset transistor via the monostable circuit during a functional phase.

The loopback circuit includes the monostable circuit.

Using a monostable circuit in the feedback loop coupling self-resetting pixels ensures high stability and added safety of the operation thereof in the full range of operational and environmental values for which the sensor is designed.

Another aspect of the invention relates to an image sensor comprising a plurality of pixels, the sensor comprising for each pixel:
  means for converting the electromagnetic energy (E) detected by the pixel into an electric current (Id) proportional to said energy;
  a first Cpix integrating capacitor including means so arranged as to cause a charge of such first Cpix capacitor to a first electric level (Vdd) and a discharge of such first Cpix capacitor to a second electric level (Vref), one of said discharge and said charge being controlled by the proportional electric current (Id), the other one of said charge or said discharge being controlled by said proportional electric current (Id);
  loopback means allowing the automatic repetition of charging and discharging of the first Cpix capacitor during charging and discharging cycles, and counting means so configured as to count the number of cycles occurring during a given integration time (Tint).

The sensor also includes means for measuring a residual electric charge in the first Cpix integrating capacitor after said integration time and processing means, also designated processing circuit, so configured as to provide a digital value representative of the electromagnetic energy (E) detected in accordance with said number of cycles and said residual electric charge. Typically the sensor includes calibration means comprising said measuring means, said measuring means being so configured as to access the values specific to each pixel of the first (Vdd) and second (Vref) electric levels, with the calibration means being so arranged as to take such specific values into account in order to correct said digital value representative of the electromagnetic energy (E) detected, said digital value being a function of said number of cycles and said residual charge.

Thus, the invention reuses the means for measuring the residual charge in order to compensate the process and operation dispersions specific to each pixel so as to correct the number of cycles having occurred and/or the measure of the residual electric charge upon completion of the integration time. The invention thus allows a significantly increase in the precision with which the energy detected by the conversion means is digitalized without significantly increasing the complexity and/or size of the sensor. The quality of the image obtained is thus improved without significantly impacting the integration density of the sensors.

Optionally, a sensor according to the invention may comprise at least one of the following optional features:
  The calibration means comprise switches so arranged as to firstly inhibit the loopback means during a calibration phase, and secondly, to enable the loopback means in a functional mode.
  Thus, in a first configuration of the switches, the invention makes use of the measurement means for performing calibration. In a second configuration of the switches, the invention measures the residual charge. The first configuration corresponds to the calibration phase and the second configuration corresponds to the functional mode.
  The sensor is so configured that, during a calibration phase, the means for measuring the residual electric charge access said values specific to each pixel of the first (Vdd) and second (Vref) electric levels.
  The first (Vdd) and second (Vref) electric levels are electric levels that optionally correspond to nominal electric levels, within one dispersion thereof. They are called predetermined electric levels or given electric levels. Typically, for each pixel the specific values of the first (Vdd) and second (Vref) electric levels correspond to 3.3-volt and 0.8-volt nominal voltages, respectively. As indicated below, the actual values Vdd and Vref, in practice, depend on each pixel. For each pixel, the difference between the specific values of the first (Vdd) and second (Vref) predetermined electric levels is approximately 2.5 Volts.
  The analog-digital converter is therefore advantageously so adapted as to obtain a measures resolution suitable both for measuring the residual charge and for measuring values specific to each pixel of the first (Vdd) and second (Vref) predetermined electric levels. It is thus so configured as to participate in the functional mode (also referred to as the functional phase), in cooperation with the cycle counting means, and the calibration mode (also referred to as the calibration mode).
  The common measuring means comprises an amplifier so adapted as to capture the residual electric charge of a pixel and to transform it into a proportional voltage during a functional phase, and so adapted as to measure the first and second electric levels, during a calibration phase.
  The sensor comprises storage means. It is so configured that, during a calibration phase, values specific to each pixel of the first (Vdd) and second (Vref) electric levels and/or correction values to be applied to each of the pixel are stored in the storage means for use during a functional phase of acquisition of an image by a user.
  Each pixel comprises a monostable loopback circuit so configured as to provide re-charging of the first Cpix integrating capacitor up to the first electric level (Vdd). Advantageously, the monostable circuit provides a stable recharge of the integrating capacitor up to the first predetermined electric level (Vdd).

Preferably, each pixel comprises a monostable loopback circuit so configured as to provide a recharge of the first Cpix integrating capacitor up to the first electric level (Vdd).

The pixels are so arranged as to form a matrix of pixels composed of columns and rows of pixels. The means for measuring the residual electric charge and the first (Vdd) and second (Vref) electric levels are common to one of a column or a line of the matrix of pixels, and are used in cooperation with means for selecting the other of a line or a column of said matrix.

The image sensor comprises a second Ccol integrating capacitor so configured as to form, with the amplifier, a charge integrating circuit. The second Ccol integrating capacitor is independent of the voltage applied to the terminals thereof. It also produces a voltage proportional to the charge transferred by a pixel.

The integrating capacitor of the amplifying circuit is a capacitor of the MIM (metal-insulator-metal) type.

The insulator of the integrating capacitor is preferably made of silicon oxide. Preferably, the metal is of the type used for making connections of the integrated circuitry comprising the sensor.

Advantageously, said metal is conducting polycrystalline silicon.

Preferably, the conversion means comprises a light-sensitive diode.

The proportional electric current (Id) preferably controls the discharge of the Cpix integrating capacitor to the predetermined second electric level (Vref).

Each pixel is of the self-resetting type.

The sensor comprises selection and insulation means so adapted as to, in each pixel, transfer to the measuring means the residual electric charge contained in the first Cpix integrating capacitor of the pixel. Advantageously, such transfer is lossless, since the whole residual charge is transferred.

The sensor is so configured as to correct said digital value representative of the electromagnetic energy (E) detected by each pixel while taking into account the Qpix value defined by the following equation:

$$Qpix_{num} = 2^A \cdot \left(K + \left(\frac{F - Qb}{Qa - Qb}\right)\right)$$

where:

Qa and Qb are digital values representing the minimum and maximum charges respectively reached by the Cpix 2 integrating capacitor of each pixel, as measured by the measuring means 80 during the calibration phase and expressed in Coulombs with:

$$Qa = Cpix(Vref + Voffset)$$

$$Qb = Cpix \cdot Vdd$$

D is the number of bits of a counter included in the counting means 40 and counting the number of cycles occurring during a given integration time (Tint);

K is the number of cycles counted by the counter for a given integration time (Tint);

A is the number of bits on which Qa and Qb are measured.

Another aspect of the invention relates to a still camera, a camera, or a monitoring or analysis device comprising at least one sensor according to any one of the above characteristics.

According to another aspect, the invention relates to a method for acquiring an image with an image sensor according to any one of the above characteristics comprising the following steps:

at least one calibration phase comprising the following steps:
a step during which the measuring means measures the values specific to each pixel of the first (Vdd) and second (Vref) predetermined electric levels;
a step of processing said values specific to each pixel of the first (Vdd) and second (Vref) predetermined electric levels and determining the corrections to be applied to each pixel in accordance with such specific values;

at least one acquisition step or phase comprising the following steps for each pixel:
a step of capturing electromagnetic energy (E) by said conversion means;
a step of determining a digital value representative of the detected electromagnetic energy (E) and dependent on said number of cycles, and on said residual electric charge;
a step of correcting said digital value representative of the electromagnetic energy (E) detected as a function of the corrections determined during the calibration phase.

Thus, after performing a step of calibration reusing the means for measuring the charge, the method according to the invention makes it possible to compensate for the process and operation dispersions specific to each pixel in order to improve the quality of the acquired image.

Preferably, prior to the step of acquisition, several calibration steps are executed.

Advantageously, after the step of determining the corrections to be applied to each pixel and prior to the step of acquisition, a step is performed for storing the corrections to be applied to each pixel.

BRIEF DESCRIPTION OF THE FIGURES

The aims, the objects, as well as the characteristics and advantages of the invention will become more apparent from the detailed description below illustrated by the following appended drawings in which.

The appended drawings are given as examples and are not restrictive of the invention.

DETAILED DESCRIPTION OF THE INVENTION

Figure 1:
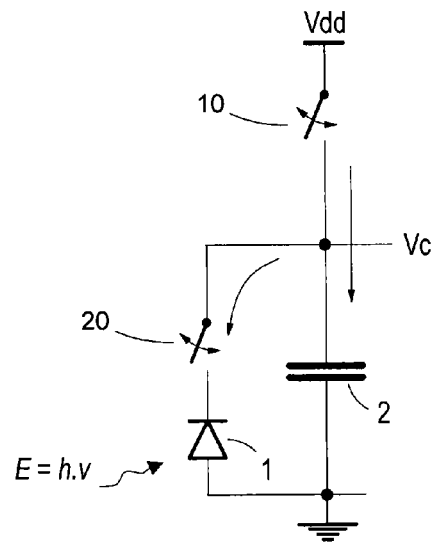
FIG. 1 shows the theory of operation of the circuit, which in each pixel, allows converting the detected light energy into an electric signal by discharging an integrating capacitor.

FIG. 1 describes the theory of operation of the circuit which, in each pixel, allows converting the light energy detected into an electric signal, and more generally the energy of the electromagnetic radiation received within the range of wavelengths for which the sensor has been designed. As shown in such Figure, each pixel comprises a photodiode 1.

Such reversely biased diode 1 generates a current Id proportional to the total light energy received as the sum of energy elementary "particle" or photon, each one having a value $E = h \cdot v$ where h is the so-called Planck's constant, i.e.: 6.62 $10^{-34}$ Joules.second and v is the radiation frequency in cycles per second or Hertz. The received energy E is therefore expressed in Joules. It should be noted that in case of complete absence of light, the diode 1 generates, however, a low dark current. Depending on the applications and ranges of wavelengths that must be measureable, a light-sensitive resistor or a bolometer may advantageously be substituted for the photodiode 1.

The measurement principle consists in using the current Id to discharge a Cpix 2 capacitor having been charged beforehand to a predetermined value. This can be easily done by connecting the Cpix 2 capacitor at a fixed supply voltage Vdd through a switch 10 for a minimum time sufficient to allow the fast full charge. It should be understood that, depending on the value of the current Id, which is as seen, proportional to the light energy detected, the speed of the capacitor discharge varies. Thus, by simply measuring the remaining charge after a determined integration time Tint, the light energy detected by the pixel can be obtained. The duration of the discharge, and hence the integration time, is simply controlled by turning on the switch 20 during the period Tint.

However, it turns out that the value of the Cpix integrating capacitor which can be obtained on the surface of a pixel is too small to meet the desirable operating range in terms of maximum and minimum measurable light energy. With the integration levels currently reached where a pixel has a typical surface of 30×30 square microns (1 micron=$10^{-6}$ meter), a capacitor of a few picofarad, ie $10^{-12}$ Farad, is possible, whereas capacitor values of at least a higher order of magnitude, i.e. a few tens of pico-farads, should be available for the measurement to be executed in a sufficient operating range during a single Cpix charge and discharge cycle as explained above.

Figure 2:
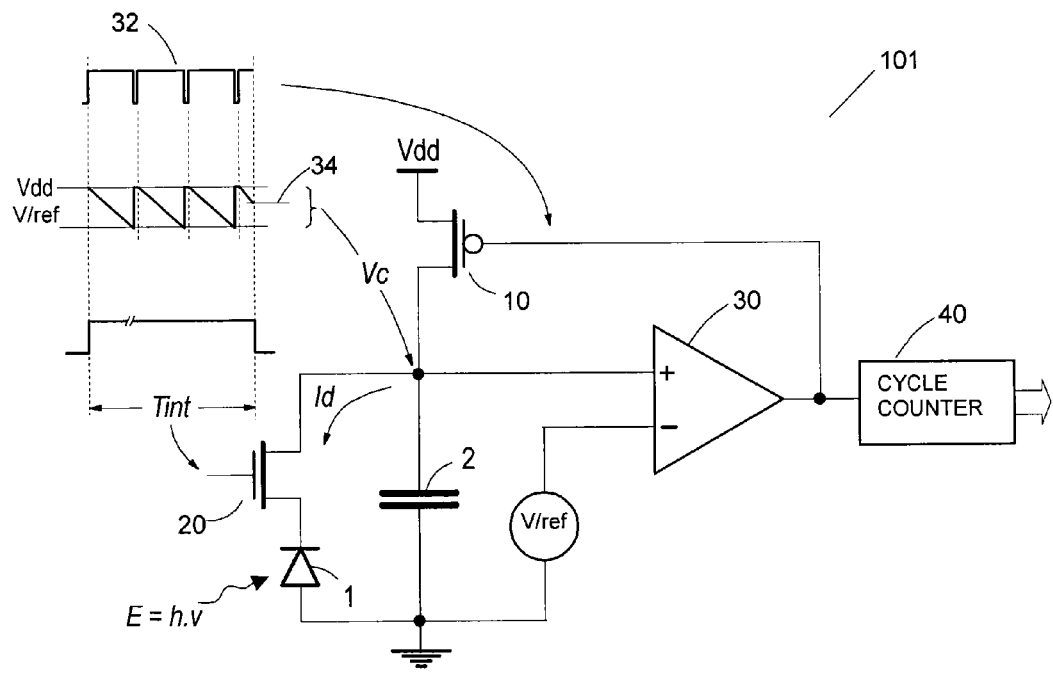
FIG. 2 shows the theory of operation of a more sophisticated system which allows converting with a low value in the integrating capacitor.

To address such problem a more elaborate circuit the diagram of which is shown in FIG. 2 has been designed. Since a capacitor sufficient value cannot be reached in each pixel, the existing Cpix capacitor is then discharged several times, and possibly a lot of times, all the more often since the light energy detected by the diode 1 is high and hence the current Id discharge is high. In such circuit, the voltage Vc across the integrating capacitor terminals may vary between the capacitor charge fixed voltage and another lower fixed voltage called Vref. When the voltage Vc reaches the voltage Vref during a discharge, a comparator circuit 30 detects it and automatically generates a reset pulse 32 which causes the Cpix quick charge through the switch 10, thus forming the loopback circuit means. As part of the implementation of such circuit with a CMOS technology, the switch 10 is typically a P-channel MOSFET transistor, as shown in FIG. 2. When it becomes highly conducting, for the duration of the reset negative pulses 32, a quick recharge of Cpix up to the supply voltage Vdd is obtained. When the transistor 10 becomes nonconducting again, a new discharge occurs. The charge and discharge cycles thus automatically repeat throughout the integration time Tint through the loopback described above, i.e. during the time when the corresponding signal is applied to a switch 20 which is, in such example, a N-channel MOSFET transistor. Made conducting by the application of the Tint signal to its gate, current Id is then free to flow between the drain and the source of transistor 20 to discharge Cpix. The number of charge and discharge cycles is counted in each pixel, by a dedicated circuit forming counting means comprising a counter 40. Therefore such number provides a measure of the amount of light energy detected by the diode 1 during the integration period. Such type of pixel, which allows the use of a low integrating capacitor by automatically recharging same as often as necessary during an integration cycle is called a self-resetting pixel 101. Preferably, such a pixel is also responsible for transmitting pulses to the counter 40. Such pixel is astable during the integration period controlled by a signal.

Advantageously, to increase the accuracy of the measurement, i.e. the operating range of the sensor, the residual voltage 34 remaining across the Cpix terminals during the last discharge interrupted by the fallout of Tint is measured. This aspect of the invention is further discussed in the following figures.

Figure 3:
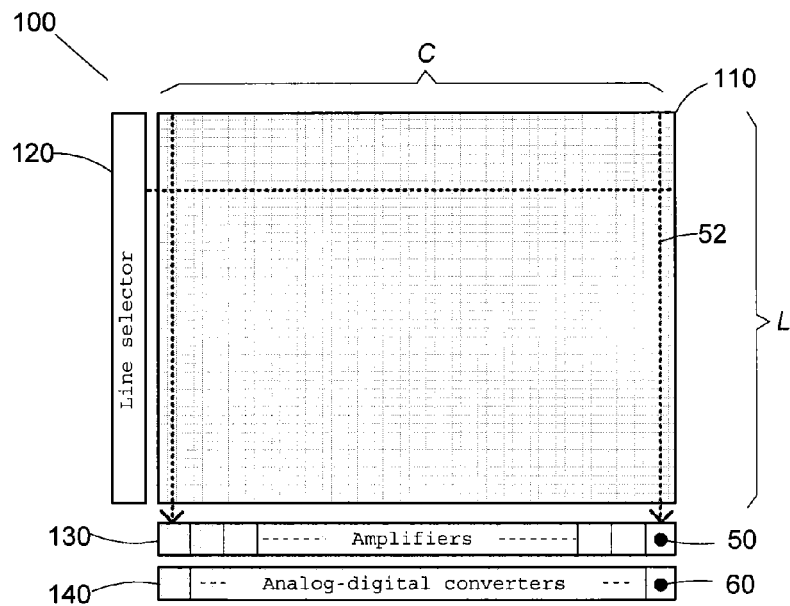
FIG. 3 is an overall view of an image sensor including a matrix of light-sensitive pixels according to the invention.

FIG. 3 illustrates an image sensor 100 also called an optoelectronic image sensor incorporating a matrix 110 of pixels of the self-resetting 101 type as described in the previous figure. This figure schematically shows the organization of the matrix 110 in rows and columns of pixels. The number of lines L and the number of columns C in the matrix 110 are defined by the application for which the sensor was designed and essentially by the definition and the format of the images to be obtained. Typically, a few hundreds, for the least dense, up to several thousands of lines and columns may be necessary. Thus, the number of pixels in a matrix 110 is commonly expressed in hundreds of thousands, and for the densest, in millions of pixels.

The light energy, and in general the electromagnetic radiation, is conventionally simultaneously captured on all pixels of the matrix 110 so as to obtain a time-consistent image, i.e. a snapshot of such image. The acquisition time of the snapshot corresponds to the integration time Tint selected. All the components shown in FIG. 2 are repeated for each pixel. Preferably, all such components are incorporated in each pixel. However, depending on the applications and the performances expected from an image sensor, it may be advantageous to share such components among the pixels. In particular, the pixel counter 40 may be shared by several pixels, even by all the pixels of a column of pixels, if the expected performances result in the acquisition of an image being done by successively selecting the lines or the groups of lines, in the pixel matrix.

The energy captured by each pixel is conventionally read row by row and possibly in groups as mentioned above. For example, a line selector 120 makes it possible to browse all of these, or all the groups of lines, after the integration time has elapsed, in order to transfer the contents of the pixel from each one of these to the peripheral circuitry of the sensor in charge of acquiring the image in a digital form. Therefore, circuits are conventionally placed at the base of each column. They will more particularly enable the acquisition and the transfer, line after line, of the value of the individual meters 40.

A converter 60 is placed at the base of each column. The same number of converters and of columns C is therefore required in the pixel matrix 110. Preferably, an amplifier 130 is also provided for each column C. The amplifiers 130 are placed at the base of column C. They form the row 130. The row of analog amplifiers 130 and the row of analog-digital converters 140 only are shown in FIG. 3. The roles of the converters 60 and the amplifiers 50 are described below in FIG. 4. It should be noted here that the organization of the pixel matrix 110 described above could also be considered by interchanging the roles of the lines L and the columns C, in which case the columns would be selected using a circuit of the 120 type and the amplifiers 130 and the analog-digital converters 140 would then be placed at one or the other end of the lines.

Figure 4:
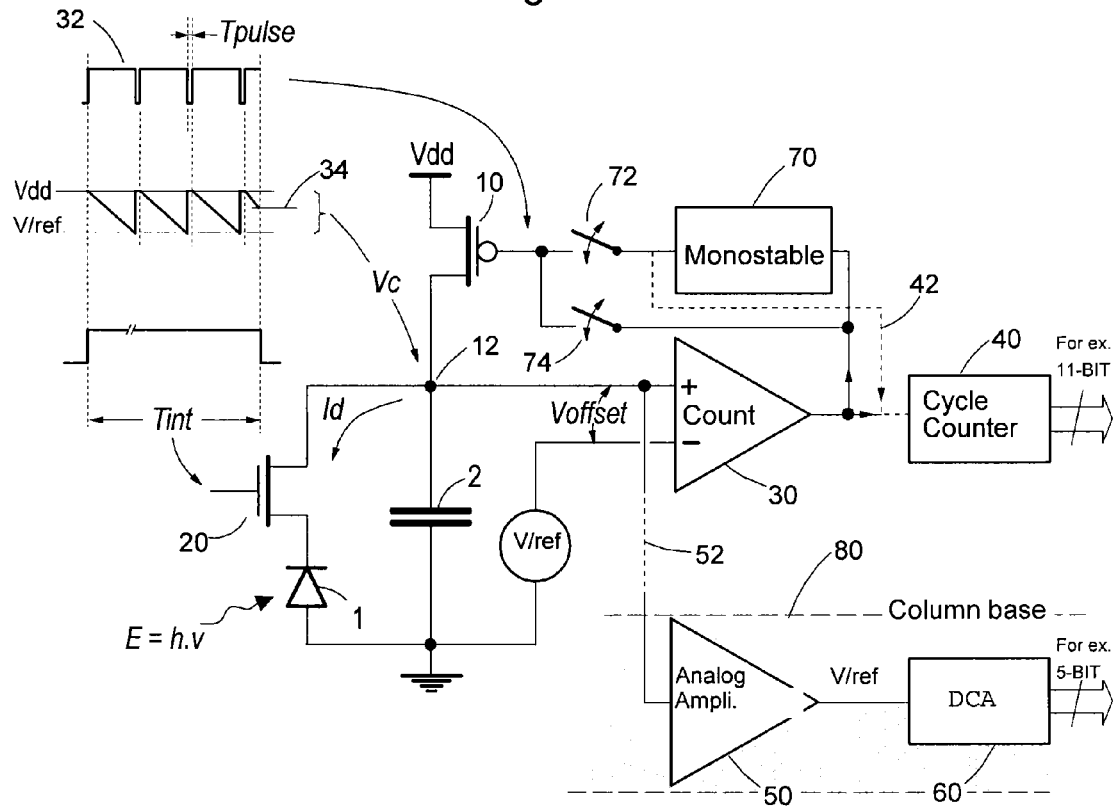
FIG. 4 shows how the invention is implemented in each pixel using circuits located at the base of a pixels matrix column.

Such theory of operation of the circuit in FIG. 4 is the same as that in FIG. 2. However, several improvements have been made in order to fulfil the objectives of the invention. They are described below.

The invention provides for means for determining the charge or the residual voltage 34 of the last interrupted discharge, as seen above, at the end of the integration period by the fallout of the Tint signal. Such means include measuring means 80 so configured as to allow, among other things, measuring the residual electric charge 34.

The measuring means 80 comprise, in particular, an analog amplifier 50 positioned at the base of each column to allow such measurement. When a line of pixels is selected for transferring the information captured during the integration phase, to the peripheral devices, each amplifier 50 input is temporarily connected, through a connection common to all the pixels of a column 52, to the internal node 12 of the pixel located at the intersection with the selected line, thereby providing access to the residual electric charge. The measuring means also comprise an analog-digital converter 60 at the amplifier 50 output. The converter 60 is also located at the base of the column. It is common to a column of pixels. The role of the amplifier 50 consists in isolating the pixel and in submitting to the analog-digital converter 60 a suitable voltage Vres proportional to the residual electric charge noted on the node 12, so that the digital encoding can be performed under the best possible conditions. Combined with the value of the cycle counter 40, the digital coding of the voltage Vres significantly increases the operating range of the sensor.

For example, the detected energy in each pixel is commonly encoded on two bytes or 16 bits, in order to differentiate $2^{16}$ i.e. in the decimal system, approximately sixty-four thousand different values of energy levels received. To achieve such result, a compromise in the pixel design taking into account, in particular: the value of the Cpix integrating capacitor, the voltages involved and the time required to charge during each cycle; consists in implementing a 11-bit binary counter thus able to count from 0 to 2047 and representing the most significant bits of the coding. In this example, the analog-digital converter 60 must be able to provide the additional 5 least significant bits to enable the coding to be done on a total of 16 bits. The residual voltage is then coded on $2^5$ or 32 levels by the converter 60. Depending on the application of the invention, the technology and the components used, many other compromises are obviously possible without departing from the invention.

Particularly advantageously, the other use of the amplifiers 50 and converters 60 included in the means 80 for measuring the residual charge relates to improving the homogeneity of the sensor behaviour over its entire surface, and its accuracy.

Each pixel is slightly different from the adjacent one more particularly because of the imperfections, the dispersions and, in general, the hazards of production. Other parameters that more generally affect the operation of a sensor are the environmental conditions such as temperature and the voltages supplied to the sensor and locally distributed to each pixel with different voltage drops.

The result of all such dispersions is a fixed background noise a portion of which at least, i.e. the one corresponding to its design, its physical location and its production is specific to each sensor and constitutes the "signature" thereof, also known as the "identity card" thereof. The fixed background noise or FBN can particularly be noted in the "dark" areas, i.e. those receiving little or no radiation energy.

During the development of the present invention, the operation and production dispersions specific to each pixel proved that they significantly affected the quality of the digitization of the electromagnetic energy detected by each photodiode. Such dispersions are particularly harmful especially when shooting at night for example with sensors whose operating range is in the infrared.

In practice, in a self-resetting pixel according to the invention as described in FIG. 4: the value of the Cpix 2 capacitor, the local supply or reference voltages such as Vdd and Vref, the voltage offset between the differential inputs of the comparator 30 (a parameter often referred to as "offset") are the main contributors to the fixed background noise and then belong to the coding of the energy received, which possibly affects both the count of the cycles number and the coding of the residual voltage.

The invention includes calibration means, also called calibration circuits, comprising the measuring means 80 previously described. The measuring means 80, more particularly the analog-digital converter 60 and advantageously the amplifier 50 situated at the base of each column, allow to overcome, if not all at least to a large extent, the operation and production dispersions specific to each pixel introducing the fixed background noise specific to each sensor.

Thus, the measuring means is common to the means for determining the residual electric charge at the end of the integration time, and to the calibration means. They are both operated in functional mode and during the calibration phase. The functional mode or functional phase refers to the operational functioning of the sensor in use, i.e. the mode in which the sensor senses the electromagnetic energy to digitize an image that the user wishes to acquire. Typically, the functional phase is a phase during which a user takes at least one picture. In the operational mode, the calibration means is not operated. The calibration mode also referred to as the calibration phase, only aims at identifying the fixed background noise specific to each pixel. Generally speaking, it determines the signature specific to each sensor. Its aim is not to digitize the image the user wants to acquire and use.

During the calibration phase and prior to use in functional mode, the common measuring means 80, in particular the converter 60 and the amplifier 50 are used to measure, at each pixel, the detected actual value of two critical parameters of the operation thereof which incorporate the dispersions discussed above.

One of the crucial parameters is the minimum charge reached by the Cpix 2 capacitor during a discharge. Such discharge level depends on the value Vref distributed at such pixel. It also depends on the voltage offset Voffset existing between the differential inputs of the comparator 30. It slightly varies from one comparator to the other. Indeed, during a discharge, the comparator switches to cause the rapid charging of Cpix until the supply voltage Vdd is reached, for example, through the transistor 10 made highly conducting by applying the pulsating signal 32 to the gate thereof, when the voltage Vc across Cpix drops below Vref, while taking into account the offset voltage of the differential inputs.

It should be noted here that the invention makes use of a monostable circuit 70, triggered by the switching of the comparator 30, in order to precisely control the duration Tpulse of the pulses 32 to ensure that the charge of Cpix will always be completed and always reach Vdd, even under the worst operating conditions, so as not to add an additional factor to the causes of the dispersions above. Thus, the charge of Cpix 2 capacitor will always be complete, provided that the Cpix charge time constant through the switch 10 is far below Tpulse, for example, ten times lower.

The use of the monostable circuit 70 also guarantees the stability of the feedback loop composed of the comparator 30, the monostable circuit 70 and the switch transistor 10 constituting the loopback means of each self-resetting pixel. As a matter of fact, the guarantee that the potential of the node 12 connected to the comparator 30 input will always go up to Vdd, whereas the other input is connected to the reference voltage Vref, avoids oscillations around Vref. Thus, the duration of the loopback mainly depends on the switching time of the monostable circuit which is adjusted independently. In particular, it depends neither on the switching voltage nor on the comparator velocity. The switching of the comparator 30 also causes the incrementing of the cycle counter 40. The counter 40 can be controlled directly by the comparator 30 or, optionally, preferably by the pulsating signal 42 from the monostable circuit 70. Such alternative is shown in dotted lines 42 in FIG. 4. The monostable circuit 70 improves the robustness of the sensor and, in practice, ensures the correct operation of the loopback throughout the operation range for which the sensor has been designed.

To measure the minimum voltage Vc and therefore the minimum charge reached by the Cpix 2 capacitor operating at the end of a discharge, the electronic circuit of a pixel according to the invention includes switches for changing from the functional mode to the calibration mode, as desired. Generally controlled by the control logic of the sensor (not shown), such switches are in a preferred embodiment of the invention, two in number in each pixel. Such switches are referenced 72 and 74 in FIG. 4. In the functional mode the switch 72 is closed and the switch 74 is open so as to connect the output of the monostable circuit normally to the gate of the transistor 10 which ensures the quick charge of Cpix during the controlled duration Tpulse. During the calibration phase, in order to measure the minimum charge specific to a pixel, the switch 72 is open and the switch 74 is closed so as to make a loop on the comparator 30 output directly with the gate of the transistor 10. The loop thus created maintains the minimum voltage normally reached at the end of the discharge in the node 12. The corresponding voltage Vc, i.e. Vref+Voffset, can then be measured by the converter 60, as is the residual voltage Vres in the operational mode at the end of the integration period Tint, when the corresponding pixels line has been selected.

Thus, the switches 72 and 74 cooperate with said common measuring means 80 for measuring the residual charge and for measuring the values Vdd and Vref specific to each pixel in order to ensure the calibration.

The values specific to each pixel of the first and second predetermined electric levels are the values Vdd and Vref specific to each considered pixel.

The other one of such crucial parameters for the operation of a pixel is the maximum charge reached by the Cpix 2 capacitor during a charge. Such parameter can be measured during the calibration phase with the switches placed as in the functional mode, i.e.: the switch 72 us closed and the switch 74 is open, while maintaining the transistor 20 closed so that no discharge can occur and forcing an astable mode of operation of the circuit 70, so that the Cpix 2 capacitor is regularly charged. The maximum value specific to the pixel is then measured as above by the converter 60 at the base of the column. Preferably, a transistor is also provided (not shown) in parallel with the transistor 10 which can pre-charge all the Cpix capacitors prior to integration. It is normally non-conducting during the whole integration period and the transfer of the residual electric charge. An additional (reset) switch is thus so configured as to charge said first Cpix integrating capacitor.

In an alternative embodiment, the reset switch 10 and/or the additional switch are so configured as to discharge the first Cpix integrating capacitor. Thus, the sensor is so configured that the calibration means, during the calibration phase, controls the loopback means to sequentially set the charge of the first capacitor of the pixel at the first and the second electric levels (Vdd, Vref), using said proportional electric current (Id) flowing through said converting means for discharging said first Cpix integrating capacitor and using said reset switch and/or an additional (reset) switch for discharging said first Cpix integrating capacitor.

Figure 5:
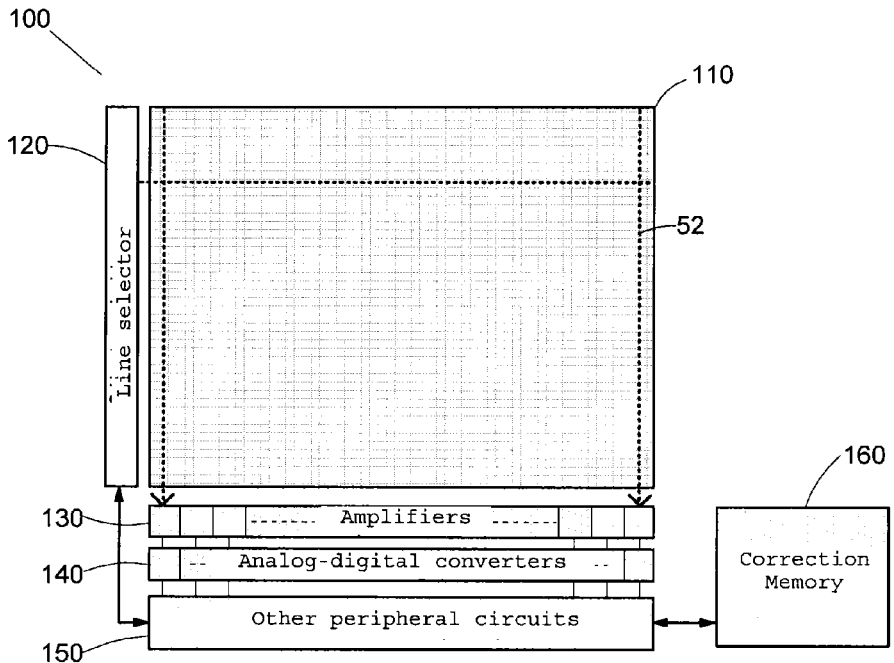
FIG. 5 depicts the memory associated with the peripheral circuits and intended for storing all the corrections determined during a calibration phase in order to standardize the behaviour of the pixels in functional mode.

As shown in FIG. 5, a memory associated with the pixels matrix 110 and all its peripheral circuits: the line selector 120, the amplifiers 130, the converters 140, and the other peripheral circuits 150, is also typically implanted in the sensor of the storage means 160, and is capable of storing all the corrections that must be made to the measures in functional mode in order to standardize the behaviour of the pixels. Based on the two previous measures of the maximum and minimum charges in calibration mode on all pixels, line after line, all the information required to generate a matrix of measures corrections in functional mode will be available.

As many corrections to be made as there are pixels can be stored in the memory 160, in which case for example a one to one correspondence will exist between the number of lines and of columns in the matrix and the organization of the memory which, for a given line address will have to be able to simultaneously output as many corrections as there are columns in the matrix, in order to correct the readings in functional mode, line after line, on the fly, as explained above.

The correction may also be less accurate in order not to have to implement too large a memory 160. Among several possibilities, it can be decided to make only one correction per row. For example, the average or median corrections measured for the row will be applied to all the pixels in the row. Many other correction schemes are possible with the system of the invention, such as the application of an average correction to spatially close pixel groups, for example 16-pixel groups corresponding to four consecutive lines and columns.

Figure 6:
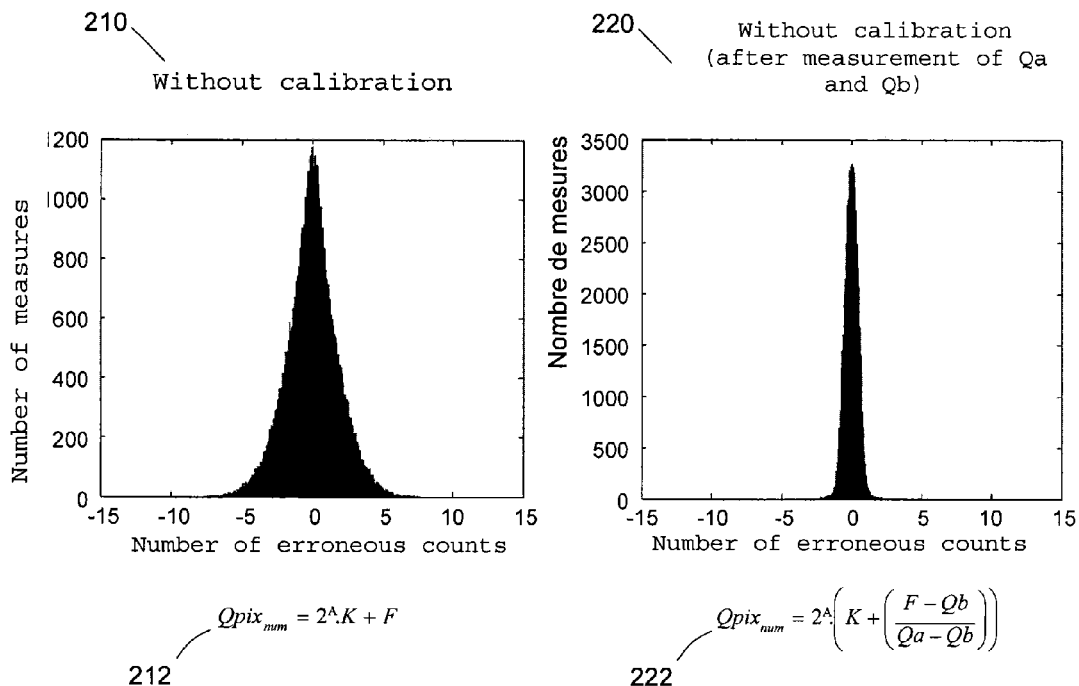
FIG. 6 illustrates the improvement of the sensor operation provided by the calibration means according to the invention.

FIG. 6 illustrates the improvement brought by calibration in the operation of the sensor. In such figure Qa represents the minimum charge and Qb the maximum charge reached by Cpix, i.e. the charges specific to each pixel which are measured using the amplifier 50 and the converter 60 in calibration mode, as explained above. The minimum charge is then:

$$Qa = Cpix(Vref + Voffset)$$

and the maximum charge:

$$Qb = Cpix \cdot Vdd$$

They are measured with a resolution corresponding to that of the converter 60, generally on A bits, and thus with an accuracy equivalent to $2^A$ different coding levels. Preferably, each value Qa and Qb is measured N times to get rid of static errors before being stored.

The histograms 210 and 220 represent the simulated deviations from the nominal value, respectively, without and after calibration. The x-axis shows the number of erroneous counts, which reflects the dispersion. The y-axis shows the number of measures. The equations 212 and 222 respectively give the charge with and without correction.

$$Qpix_{num} = 2^A \cdot K + F \qquad \text{Equation 212}$$

$$Qpix_{num} = 2^A \cdot \left(K + \left(\frac{F - Qb}{Qa - Qb}\right)\right) \qquad \text{Equation 222}$$

In the above equations, K is the number of cycles counted by the cycle counter 40. In general the counter comprises D bits to count from 0 to $2^{D-1}$ cycles. F is the analog fraction measuring the residual electric charge at the end of the integration period encoded by the converter in a range from 0 to $2^{A-1}$ levels as already indicated above. In the example of FIG. 4, D and A respectively correspond to 11 and 5 bits to allow the encoding of the values detected by the pixel matrix on a total of 16 bits.

A very significant reduction in the FBN after calibration 220 can be noted. The histogram 210 without calibration is dispersed across a width of +/−5 and lowered, after calibration 220, to a width of +/−1.

An exemplary correction with A=5 i.e. 32 levels, when integrating a pixel (i, j) at the intersection of the line i and the column j is:

After digitization by the analog-digital converter 60:

$$Qpix=(K+F/32).$$

Qpix becomes after correction:

$$Qpixn=K(Qan-Qbn)+(F-Qbn)\times 32/(Qan-Qbn)$$

which expresses the standard conversion of the residual electric charge.

A particular digital example with K=980, F=12; Qan=29.73 and Qbn=2.35, is:

$$Qpixn=980\times 27.38+=(12-2.35)\times 32/27.38=26832.4+ 281.42=27113.82$$

Whereas, if there had been no calibration:

$$Qpixn=980\times 32+12=31372$$

As previously mentioned, during the calibration Qa and Qb are more accurately measured by cumulating the results of several measures.

In practice, the counter gives a digital value of A bits and thus allows to distinguish $2^A$ different values: from 0 to $2^{A-1}$ Qa and Qb are digital values representing the minimum and maximum charges reached by Cpix and are expressed in Coulombs.

Briefly, calibration consists in first acquiring a black image, i.e. without any illumination by the sensor. Because of dispersions, the same black level is not obtained in each pixel. The fixed background noise is obtained by measuring the minimum Qa and maximum Qb charges of each pixel, dependent on Vdd and Vref respectively. The equation 222 can then be applied for the compensation thereof.

Figure 7:
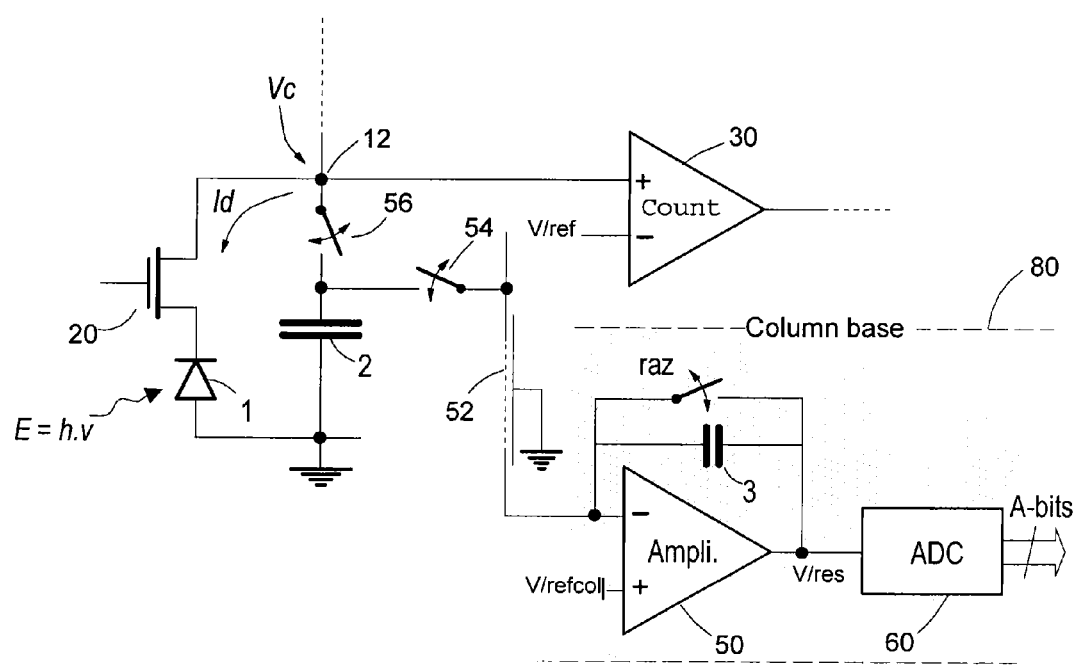
FIG. 7 shows a preferred embodiment of the invention relating to the transfer of the residual charge of one pixel to the measuring circuit located at the base of the pixels matrix column.

FIG. 7 depicts a preferred embodiment of the invention relating to the transfer of the residual electric charge from one pixel to the measuring circuit 80 located at the base of the column comprising the amplifier 50 and the converter 60.

The amplifier 50 is then a differential amplifier which forms an integrating circuit with a Ccol 3 capacitor connected between the output and negative input of the amplifier 50. The Ccol 3 capacitor thus belongs to the measurement means 80 common to the residual electric charge and the values specific to each pixel. The Ccol 3 capacitor is located at the base of the column where the occupied surface constraints are less significant than in the pixel matrix, and can be a low density capacitor. It is advantageously formed as a stack of metal/insulator/metal (MIM) layers, where conducting polycrystalline silicon may also be substituted for one or the other, or both metallic layers. The advantage is then that the Ccol 3 capacitor has a very good linearity unlike the Cpix 2 which is denser in order to minimize the surface required in the pixel, but the capacitor value of which varies much more when voltage Vc across the terminals thereof varies. The linearity of the Cpix capacitor, i.e. the independence of the value of the storage capacity thereof with respect to the voltage at the terminals thereof is an important contributor for achieving a good linearity between the radiation detected energy and the conversion thereof into proportional electric values.

The residual electric charge contained in the Cpix 2 capacitor can be transferred without loss in the Ccol 3 capacitor, at the end of the integration period when the corresponding line of pixels has been selected and the Cpix 2 capacitor isolated from the rest of the pixel using the switches 54 and 56, in spite of the relatively high capacity of the connection which links all the pixels in a column 52.

Thus, the voltage Vres is proportional to the residual electric charge of Cpix i.e. Qpix, and may be accurately digitized by the analog-digital converter 60. Its value is: Vr=−Qpix/Ccol, a value which is converted by the analog-digital converter 60.

When the digital values have been transferred to the peripheral circuits 150 of FIG. 5, the integrator can be reset using the reset switch. Similarly, as the content of the cycle counter of FIG. 4 has been transferred, it is also reset before another integration cycle occurs.

Thanks to the numerous characteristics described above, the invention can thus significantly improve the quality of digitized images.

The invention is not limited to the embodiments described above, but extends to all embodiments within the spirit thereof.

It particularly advantageously applies to pixels matrices requiring high dynamics in the infrared range. It provides very significant improvements in other ranges of the electromagnetic spectrum, too, such as the visible or the ultraviolet spectra.

The invention claimed is:

1. An image sensor comprising a plurality of pixels and comprising, for each pixel:
   means for converting electromagnetic energy detected by the pixel into an electric current proportional to the energy;
   a first integrating capacitor and means to cause a charge of the first capacitor to a first electric level and a discharge of the first capacitor to a second electric level, one of the discharge and the charge being controlled by the proportional electric current, the other one of the charge or the discharge being controlled by an electric current flowing through a reset switch;
   loopback means allowing automatic repetition of charging and discharging of the first capacitor during charging and discharging cycles, the loopback means including a comparator having an input connected to the first capacitor, with the comparator output being connected to the reset switch;
   counting means configured to count a number of cycles occurring during a given integration time in the first capacitor;
   means for measuring a residual electric charge present in the first capacitor after a time of integration;
   processing means configured to provide a digital value representative of electromagnetic energy detected as a function of the number of cycles and the residual electric charge;
   calibrations means configured to, in a calibration phase:
      control the loopback means to successively establish the charge of the first capacitor at the first electric level, and then at the second electric level, using the proportional electric current flowing through the conversion means to discharge or charge the first capacitor and using the reset switch and/or an additional switch to charge or discharge the first capacitor; and measure, using the measuring means, the first and second electric levels established; and storage means configured to store, during the calibration phase, values specific to each pixel corresponding to the first and second electric levels and/or correction values calculated from the specific values, and configured to use, during a functional phase, the stored values specific to each pixel to correct the digital value representative of the detected electromagnetic energy.

2. An image sensor according to claim 1, further comprising in each pixel a monostable circuit positioned between the comparator output and the reset switch and comprising switches positioned between the reset switch and respectively the monostable circuit or the comparator output for directly connecting the comparator output to the reset transistor during a calibration phase and connecting the comparator output to a reset transistor via the monostable circuit during a functional phase.

3. An image sensor according to claim 1, wherein the measuring means configured to measure the residual electric charge and the first and second electric levels comprises an analog-digital converter.

4. An image sensor according to claim 1, wherein the measuring means comprises an amplifier configured to read the residual electric charge of a pixel and to transform it into a proportional voltage during a functional phase, and to measure the first and second electric levels, during a calibration phase.

5. An image sensor according to claim 1, wherein the sensor is configured so that, during a calibration phase, values specific to each pixel of the first and second electric levels and/or correction values to be applied to each of the pixel are stored in the storage means for use during a functional phase.

6. An image sensor according to claim 5, further comprising, in each pixel, a monostable loopback circuit configured to provide a charging of the first capacitor up to the first electric level.

7. An image sensor according to claim 1, wherein the pixels are configured to form a matrix of pixels composed of columns and lines of pixels, and wherein the means for measuring the residual electric charge and the first and second electric levels are common to one of a column or a line of the matrix of pixels, and is used in cooperation with means for selecting the other of a line or a column of the matrix.

8. An image sensor according to claim 7, further comprising a second integrating capacitor configured to form, with the amplifier a charge integrating circuit, with the second capacitor being substantially independent of voltage applied to terminals thereof to produce a voltage proportional to the charge transferred by a pixel.

9. An image sensor according to claim 1, wherein the conversion means comprises a light-sensitive diode.

10. An image sensor according to claim 1, wherein each pixel is of self-resetting type.

11. An image sensor according to claim 1, further comprising selection and insulation means configured to, in each pixel, transfer to the measuring means the residual electric charge contained in the first capacitor of the pixel.

12. An image sensor according to claim 1, configured to correct the digital value representative of the electromagnetic energy detected by each pixel while taking into account the Qpix value defined by equation:

$$Qpix_{num} = 2^A \cdot \left( K + \left( \frac{F - Qb}{Qa - Qb} \right) \right)$$

wherein:

Qa and Qb are digital values representing the minimum and maximum charges respectively reached by the integrating capacitor Cpix of each pixel, as measured by the measuring means during the calibration phase and expressed in Coulombs with:

$Qa = Cpix(Vref + Voffset)$ $Qb = Cpix \cdot Vdd$

D is the number of bits of a counter included in the counting means and counting the number of cycles occurring during a given integration time;

K is the number of cycles counted by the counter for a given integration time;

A is the number of bits on which Qa and Qb are measured.

13. A method for acquiring an image by an image sensor according to claim 1, comprising:

at least one calibration phase comprising:
the measuring means measuring the values specific to each pixel of the first and second electric levels;
processing the values and determining corrections to be applied to each pixel in accordance with such values;

at least one acquisition phase for each pixel comprising:
capturing electromagnetic energy by the conversion means;
determining a digital value representative of the detected electromagnetic energy and dependent on the number of cycles, and on the residual electric charge;
correcting the digital value representative of the electromagnetic energy detected as a function of the corrections determined during the calibration phase.

* * * * *